United States Patent [19]
Jin

[11] Patent Number: 5,983,304
[45] Date of Patent: Nov. 9, 1999

[54] BUFFER FLUSH CONTROLLER OF A PERIPHERAL COMPONENT INTERCONNECT-PERIPHERAL COMPONENT INTERCONNECT BRIDGE

[75] Inventor: Sung-Kon Jin, Kyungki-do, Rep. of Korea

[73] Assignee: SamSung Electronics Co., Ltd., Kyungki-do, Rep. of Korea

[21] Appl. No.: 08/759,880

[22] Filed: Dec. 3, 1996

[30] Foreign Application Priority Data

Dec. 5, 1995 [KR] Rep. of Korea ............ 95-46783

[51] Int. Cl.⁶ .................................. G06F 13/00
[52] U.S. Cl. .................... 710/129; 395/280; 395/293; 395/306
[58] Field of Search ................ 395/309, 280, 395/306, 200.02, 293, 250

[56] References Cited

U.S. PATENT DOCUMENTS

| | | |
|---|---|---|
| 4,625,296 | 11/1986 | Shriver . |
| 4,862,411 | 8/1989 | Dishon et al. . |
| 5,117,486 | 5/1992 | Clark et al. ............ 395/250 |
| 5,345,577 | 9/1994 | Chan et al. . |
| 5,438,666 | 8/1995 | Craft et al. . |
| 5,535,341 | 7/1996 | Shah et al. ............ 395/306 |
| 5,544,346 | 8/1996 | Amini et al. ............ 395/481 |
| 5,592,622 | 1/1997 | Isfeld et al. ............ 395/200.02 |
| 5,625,779 | 4/1997 | Solomon et al. ............ 395/293 |
| 5,717,876 | 2/1998 | Robertson ............ 395/309 |
| 5,790,869 | 8/1998 | Melo et al. ............ 395/728 |

*Primary Examiner*—Ayaz R. Sheikh
*Assistant Examiner*—Eric S. Thlang
*Attorney, Agent, or Firm*—Robert E. Bushnell, Esq.

[57] ABSTRACT

A buffer flush controller, of a peripheral component interconnect-peripheral component interconnect bridge (PPB), includes a first compounding circuit, a first state machine, a second state machine, and a second compounding circuit. The buffer flush controller can maintain data consistency by efficiently controlling a flush operation of a data buffer of a peripheral component interconnect bridge, and the buffer flush controller can ensure a normal system operation without deadlock.

29 Claims, 9 Drawing Sheets

BUFFER FLUSH CONTROLLER OF A PERIPHERAL COMPONENT INTERCONNECT-PERIPHERAL COMPONENT INTERCONNECT BRIDGE

CLAIM OF PRIORITY

This application makes reference to, incorporates herein, and claims all benefits accruing under 35 U.S.C. §119 from an application for Buffer Flush Controller of a Peripheral Component Interconnect-Peripheral Component Interconnect Bridge earlier filed in the Korean Industrial Property Office on Dec. 5, 1995 and there duly assigned Ser. No. 95-46783.

BACKGROUND OF THE INVENTION

1. Field of the Invention

The present invention relates to a buffer flush controller, and more particularly to a buffer flush controller of a peripheral component interconnect-peripheral component interconnect bridge.

2. Description of the Prior Art

In order to improve the efficiency of a computer, a computer system often uses various data buffers such as a posted write buffer, a read buffer, and a line buffer. Because data consistency sometimes cannot be maintained when these buffers are used, a buffer system can fall into deadlock and cause a fatal defect in the computer system. For this and other reasons, contemporary practice is concerned with handling data and memory access with peripherals, in situations with flush of data, and in situations that are related to these situations. One exemplar, Craft et al. (U.S. Pat. No. 5,438,666, Shared Memory Bus System for Arbitrary Access Control Among Contending Memory Refresh Circuits, Peripheral Controllers, And Bus Masters, Aug. 1, 1995) proposes use of computers having a shared address, data and control bus for providing access to a memory storage unit to store instructions and data therein and to retrieve instructions and data therefrom. Bus arbitration units determine which of many devices is granted access to a shared bus, such as an AT-type shared bus as used in an IBM®PC-AT or a compatible computer system. Chan et al. (U.S. Pat. No. 5,345,577, DRAM Refresh Controller With Improved Bus Arbitration Scheme, Sep. 6, 1994) shows a cache controller with both burst and hidden refresh modes. In the burst mode, refresh requests are counted, but not acted on, until a predetermined number of refresh requests have been received. In the hidden refresh mode, a request is acted upon, but no hold signal is sent back to stop the central processing unit while the refresh request is being acted on. Circuitry is provided which allows local memory access, but holds other memory access until the refresh is completed. In addition to the data buses, data buffers are provided. Dishon et al. (U.S. Pat. No. 4,862,411, Multiple Copy Data Mechanism On Synchronous Disk Drives, Aug. 29, 1989) advocated use of multiple copy data mechanisms on synchronous disk drives. At least two direct access storage devices that are predetermined to record the same data from a central processing unit, are normally kept synchronized with each other except during the transient power up phase. The synchronization of direct access storage devices is controlled and maintained by synchronization control independent of any commands from the central processing unit. Shriver (U.S. Pat. No. 4,625,296, Memory Refresh Circuit With Varying System Transparency, Nov. 25, 1986) shows a memory refresh circuit with varying system transparency. A memory refresh circuit controls the refreshing of dynamic RAM included in a system wherein a control store outputs micro-code instructions to control the system operation in response to sequences specified by a sequence and interrupt logic circuit. A counter transmits certain counts of system machine cycles to an array logic device.

SUMMARY OF THE INVENTION

An object of the present invention is to provide an improved buffer flush controller.

Another object is to provide an improved buffer flush controller for a peripheral component interconnect-peripheral component interconnect bridge sometimes referred to as (PPB).

Still another object is to provide a buffer flush controller of a peripheral component interconnect bridge which maintains data consistency by efficiently controlling a flush operation of a data buffer of a peripheral component interconnect bridge.

Yet another object is to provide a buffer flush controller of a peripheral component interconnect bridge which ensures normal system operation without deadlock.

In order to achieve one or more of the above objects, a buffer flush controller of the present invention includes a first compounding circuit 10 generating a buffer flush request signal (also referred to as a bridge flush request signal for a peripheral component interconnect bridge (PPBFLSHREQ) to corresponding devices when a first buffer flush request signal (FLSHREQ_) is received from a peripheral component interconnect-EISA bridge (hereinafter referred to as PCEB) or a second buffer flush request signal (AFLUSH_, ESC_) is received from an EISA system controller (hereinafter referred to as ESC) after an advanced programmable interrupt controller (hereinafter it is called APIC) generates an interrupt. A first state machine 20 outputs control signals (PPBMEMACK_, SDISPSTA_) to perform a flush of a data buffer and stop using the data buffer when either the buffer flush request signal (also referred to as a bridge flush request signal) of a peripheral component interconnect bridge (PPBFLSHREQ) from the above-mentioned first compounding circuit 10 is received or a first flush finishing signal (SBUFNE_), which shows that a flush of an inner buffer of a peripheral component interconnect bridge has been finished, is received. A second state machine 30 outputs control signals (SDISPSTP_, INTEN) to perform a flush of a data buffer of a peripheral component interconnect bridge and stop using the data buffer when either a first flush finishing signal (SBUFNE_), showing that a flush of a data buffer of a peripheral component interconnect bridge has been finished, is received or an interrupt request signal (INTR) is received. A second compounding circuit 40 outputs a third flush performance signal (SDISPST) and a fourth flush finishing signal (MEMACK_) showing that a buffer flush of a peripheral component interconnect bridge has been finished, after compounding control signals (PPBMEMACK_, SDISPSTA_, SDISPSTP_) received from the above-mentioned first state machine 20 and second state machine 30, and a third flush finishing signal (BCUMEMACK_).

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
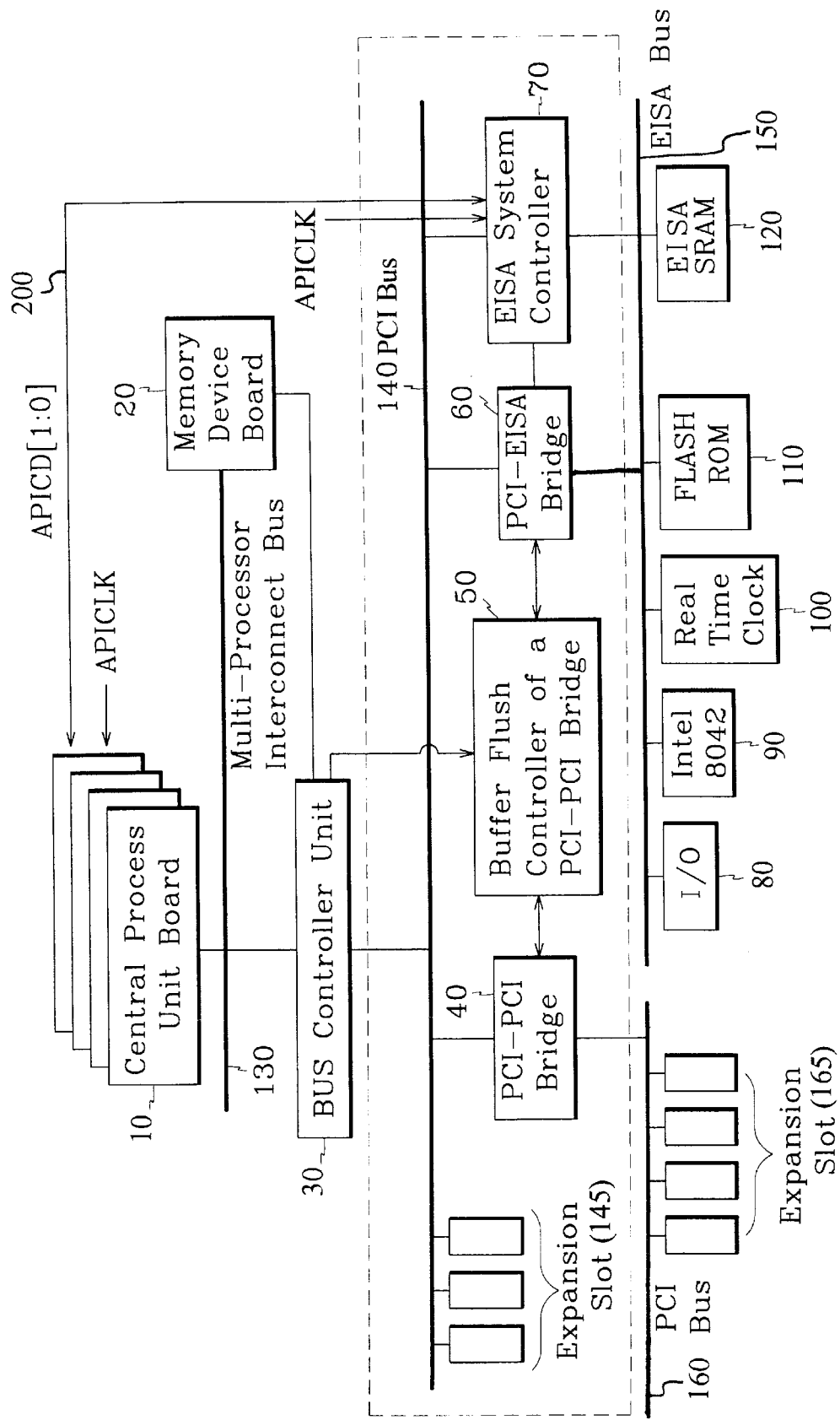
FIG. 1 is a diagram showing a location of a buffer flush controller of a peripheral component interconnect bridge built with the principles of the present invention.
Figure 2:
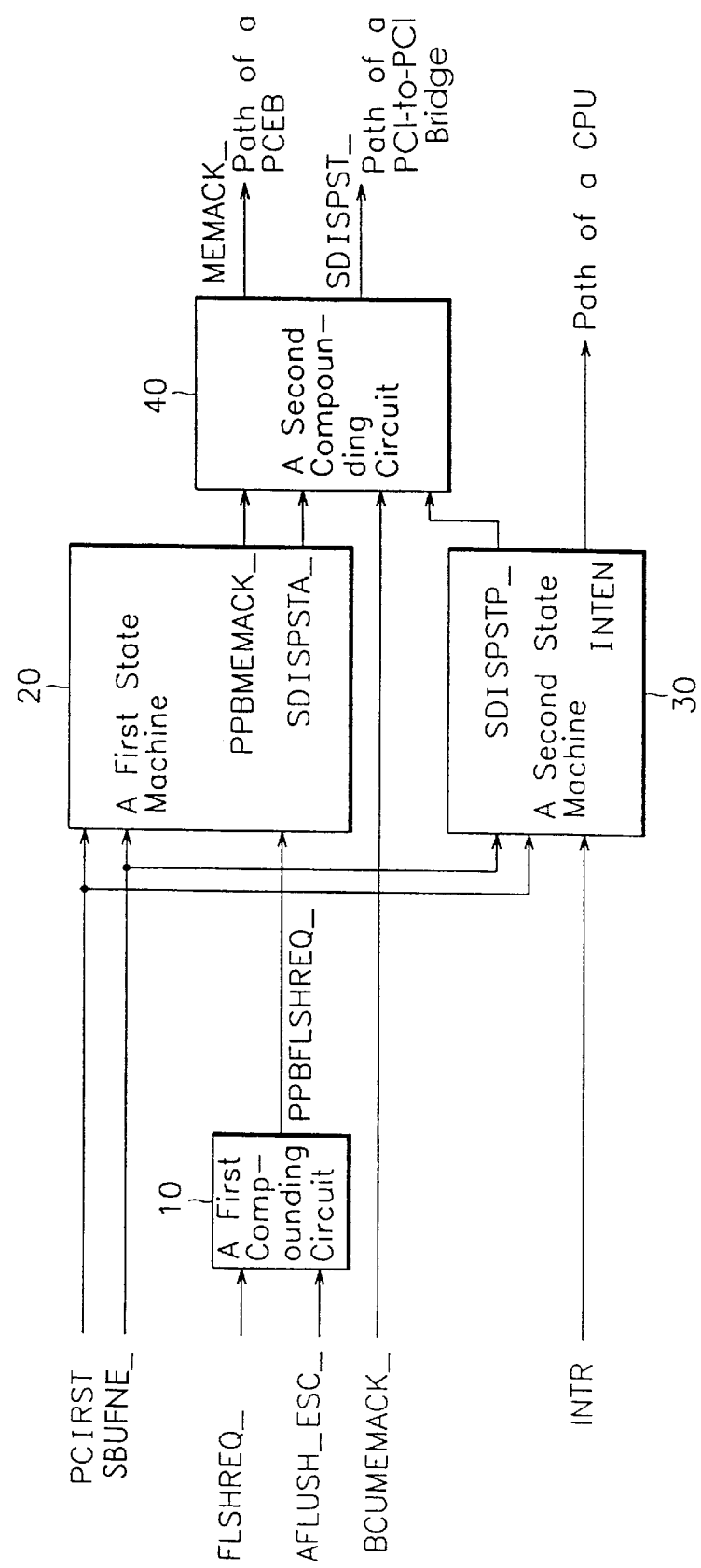
FIG. 2 is a diagram showing components of a buffer flush controller of a peripheral component interconnect bridge built with the principles of the present invention.
Figure 3A:
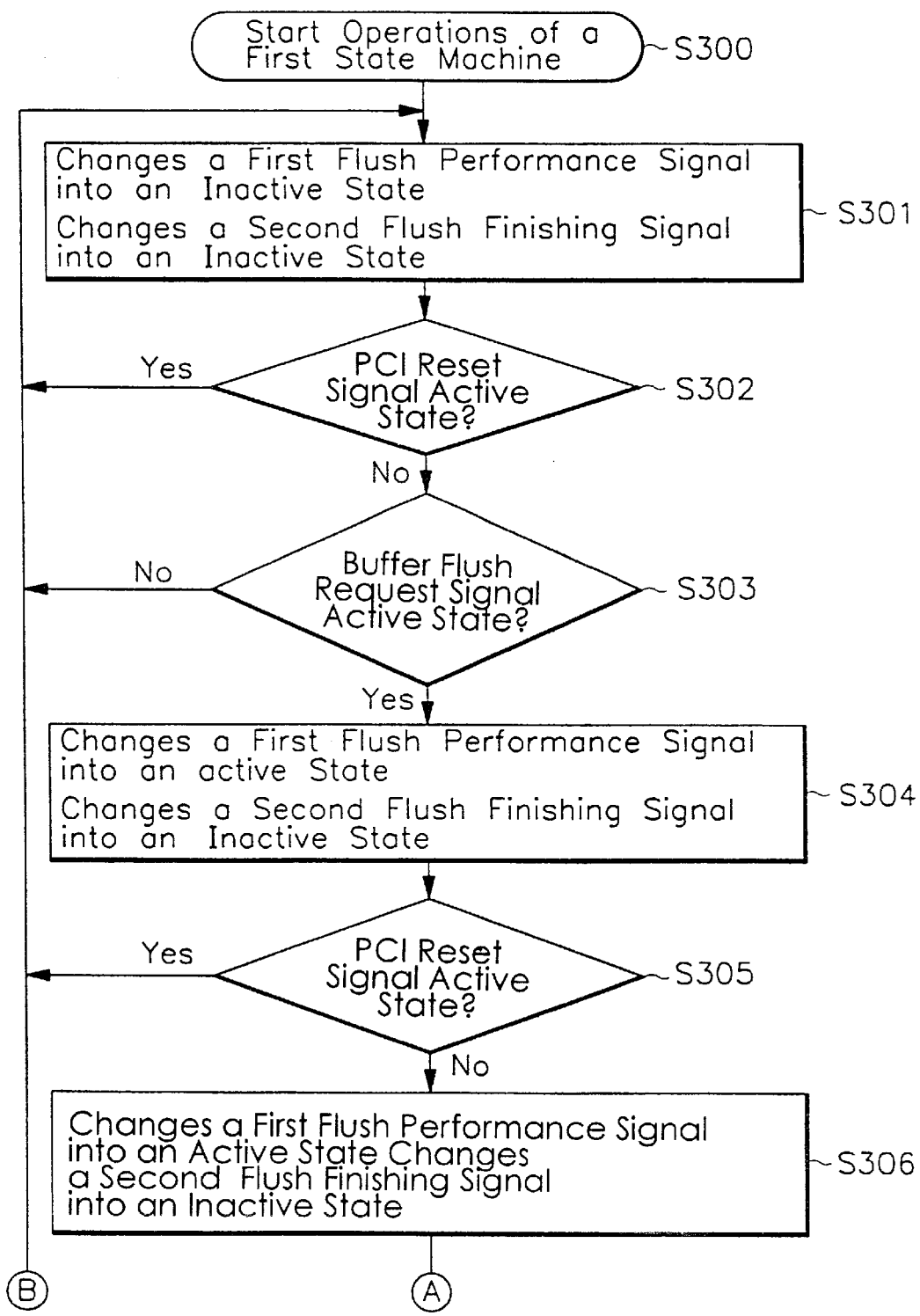
FIG. 3A is the first half of a flowchart showing the operation of a first state machine of a buffer flush controller of a peripheral component interconnect bridge performed in accordance with a preferred embodiment of the present invention.
Figure 3B:
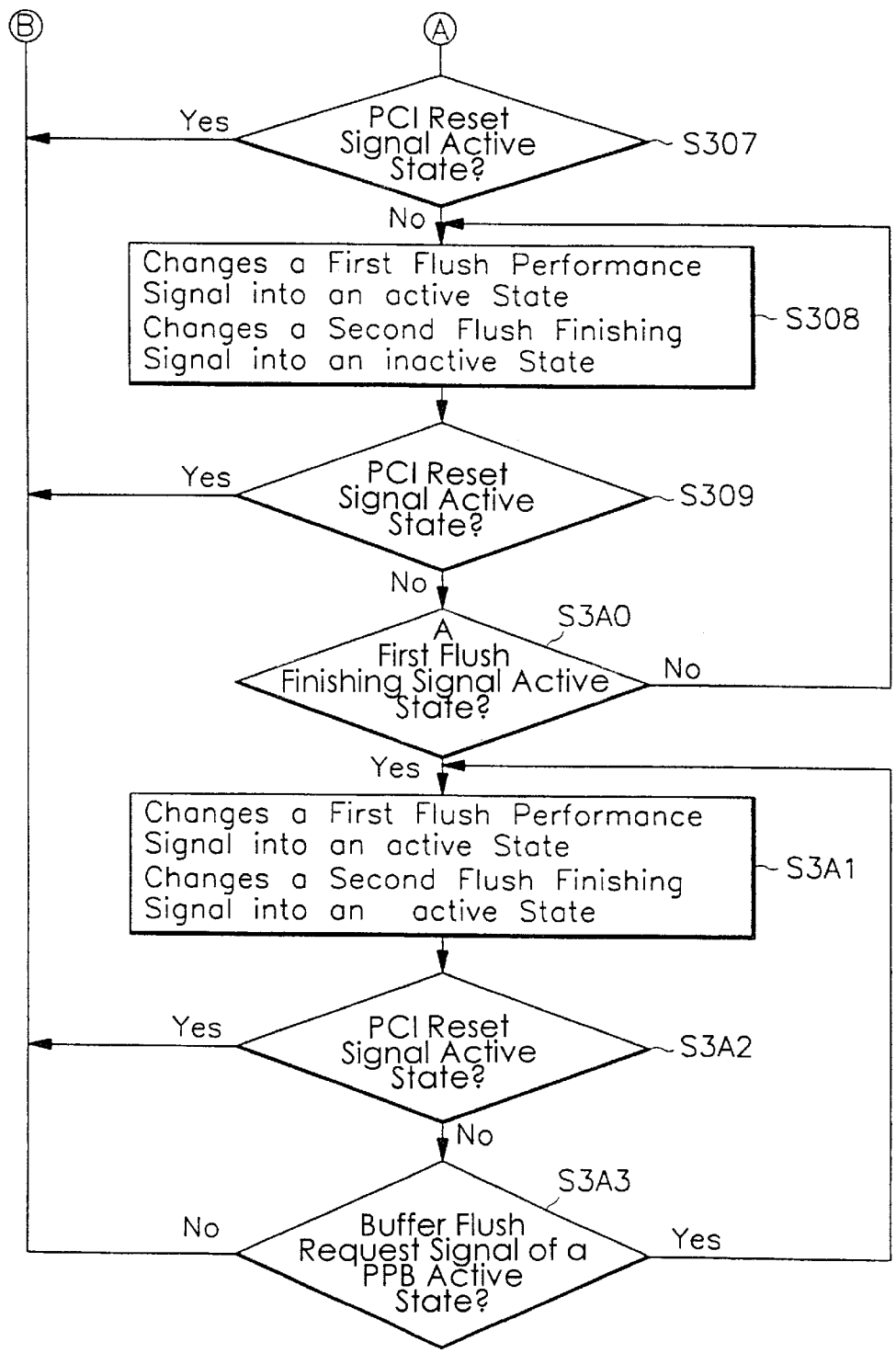
FIG. 3B is the second half of the flowchart showing the operation of a first state machine of a buffer flush controller of a peripheral component interconnect bridge performed in accordance with a preferred embodiment of the present invention, begun in FIG. 3A.
Figure 4A:
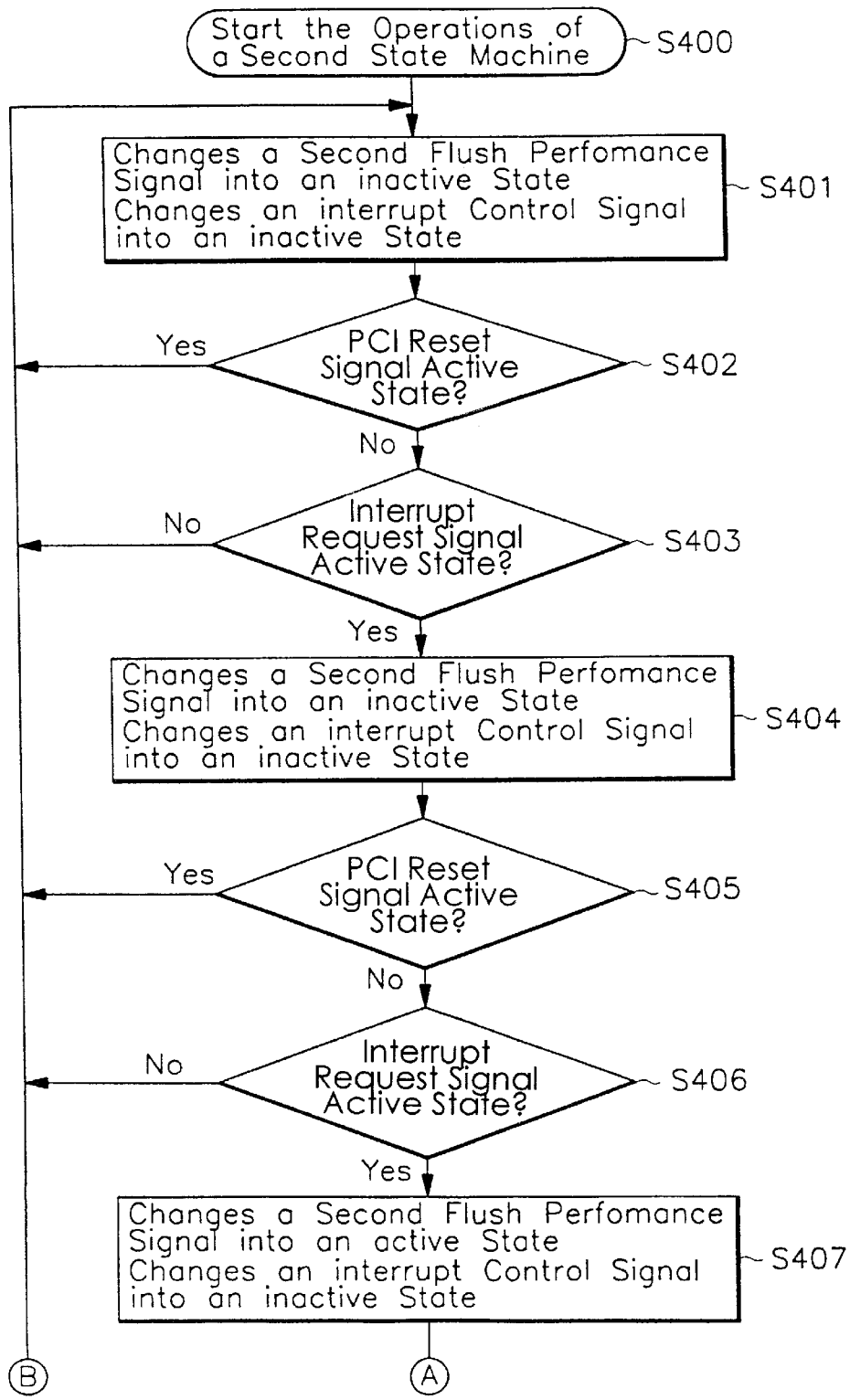
FIG. 4A is the first half of a flowchart showing the second state machine of a buffer flush controller of a peripheral component interconnect bridge performed in accordance with the preferred embodiment of the present invention.
Figure 4B:
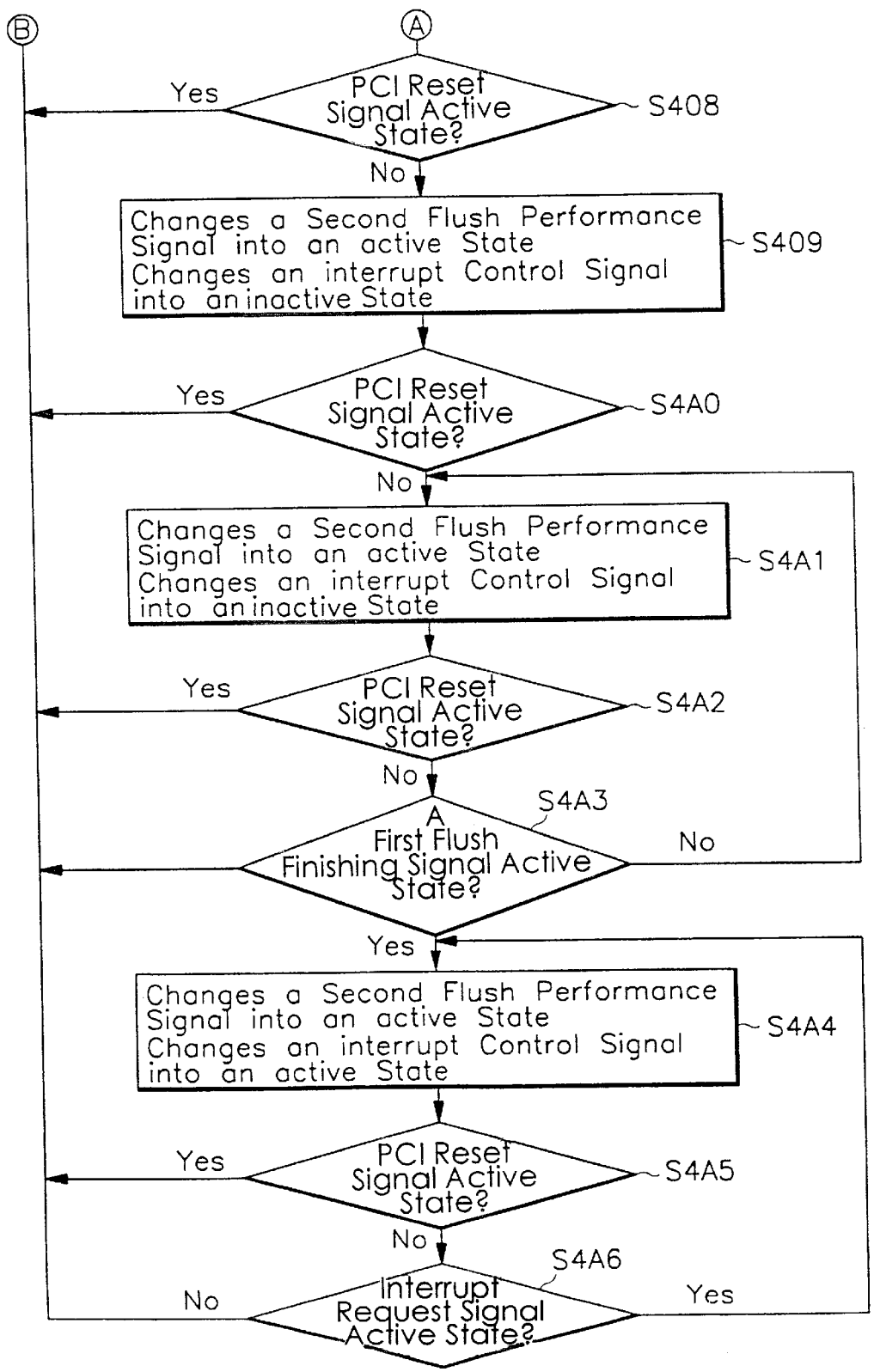
FIG. 4B is the second half showing the flowchart of a second state machine of a buffer flush controller of a peripheral component interconnect bridge performed in accordance with the preferred embodiment of the present invention, begun in FIG. 4A.
Figure 5:
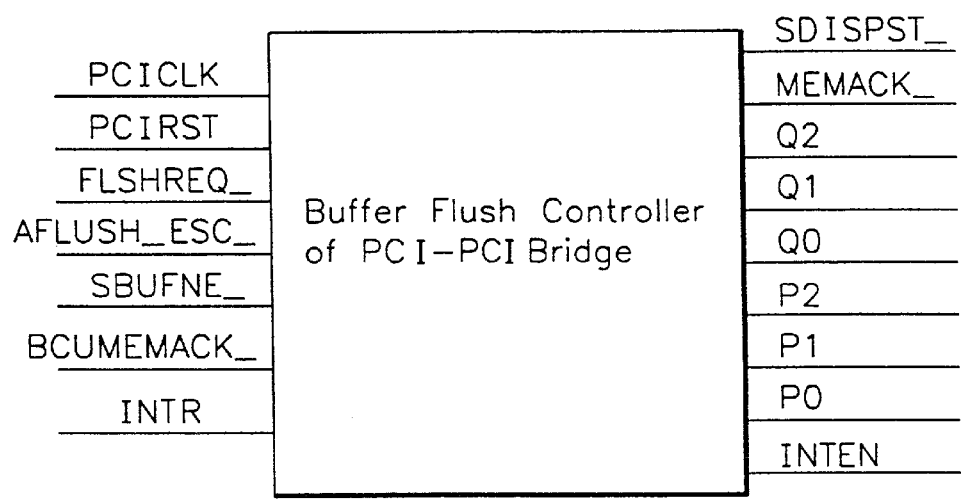
FIG. 5 is a diagram depicting an arrangement of output signals generated by a buffer flush control signal of a peripheral component interconnect bridge in accordance with the operation of the preferred embodiment of the present invention.
Figure 6:
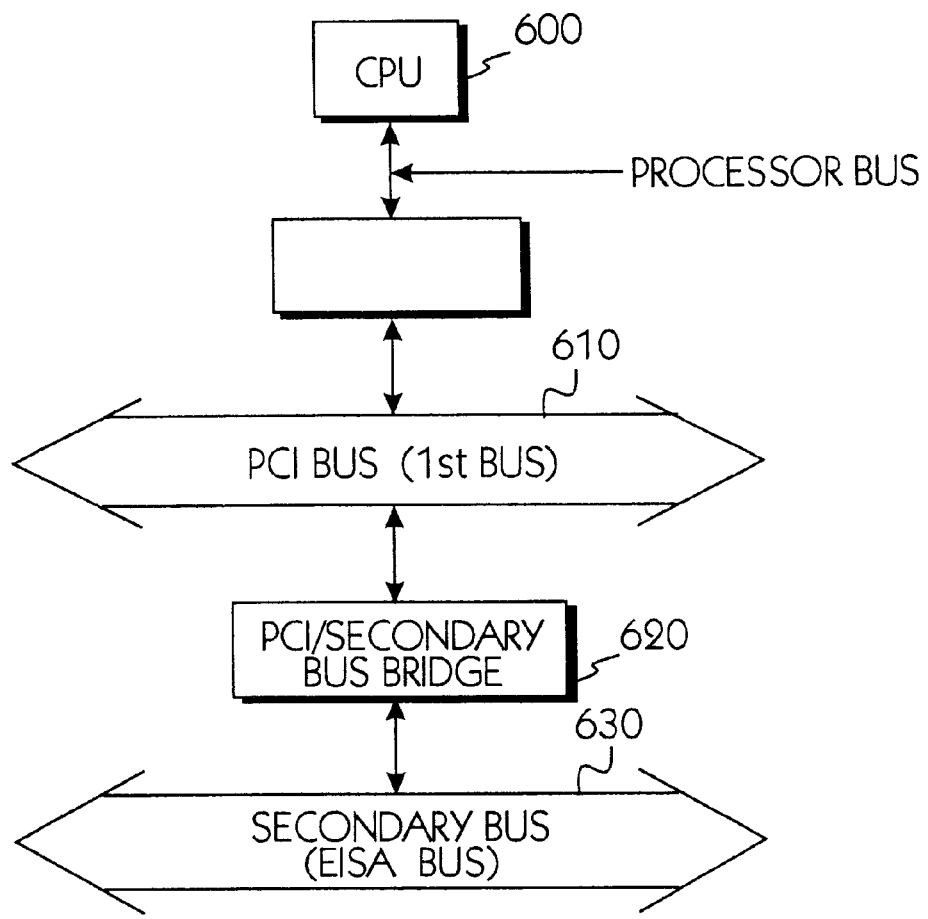
FIG. 6 is a diagram showing a single peripheral component interconnect bus.
Figure 7:
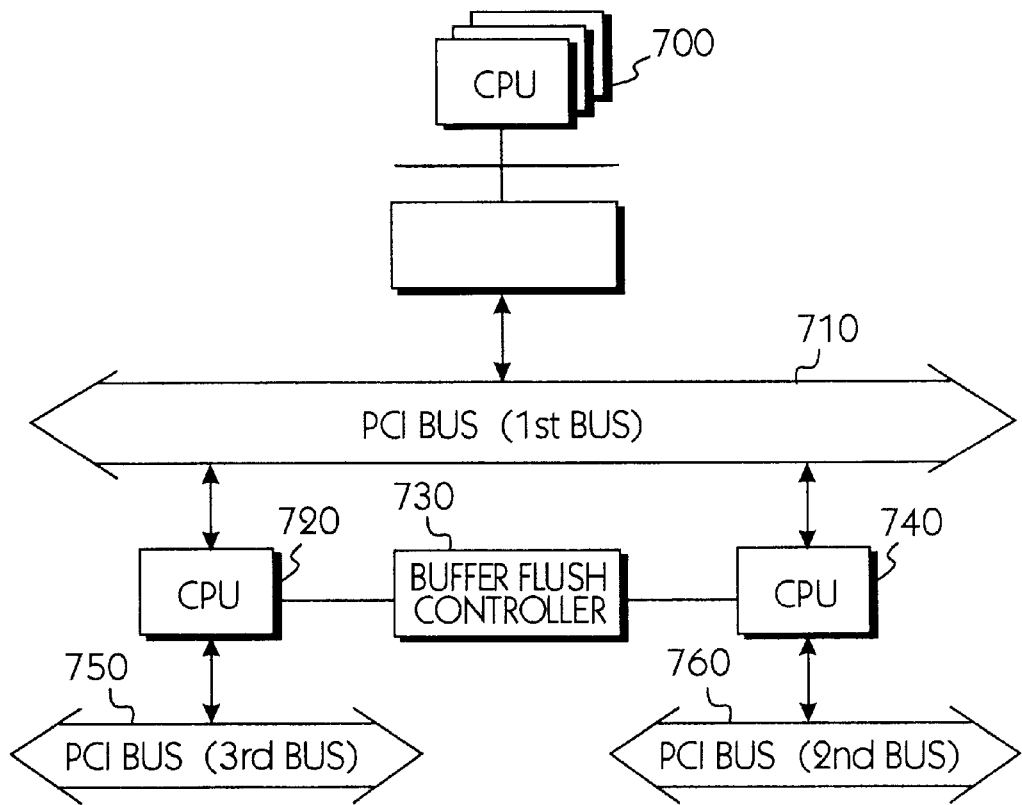
FIG. 7 is a diagram showing two peripheral component interconnect buses coupled to one another via a bridge circuit.

FIG. 6 shows a diagram of a single peripheral component interconnect bus. FIG. 7 shows a diagram of two peripheral component interconnect buses coupled to one another via a bridge circuit. FIG. 6 illustrates a central processing unit (CPU) 600, a peripheral component interconnect bus (PCI bus) 610, a PCI/secondary bus bridge 620, and an EISA (expanded industry standard architecture) bus 630. FIG. 7 illustrates a central processing unit (CPU) 700, a first peripheral component interconnect (PCI) bus 710, a PCI bus-to-PCI bus bridge (PPB) circuit 720, a buffer flush controller 730, a bridge 740, a second PCI bus 750, and an EISA bus 760. Turning now to the drawings, FIG. 1 illustrates an environment of a buffer flush controller of a peripheral component interconnect bridge in accordance with the preferred embodiment of the present invention. FIG. 1 illustrates a central process unit board 10, a memory device board 20, a bus controller unit (BCU) 30, and a peripheral component interconnect bus-to-peripheral component interconnect bus bridge (PPB) 40. In addition, there is shown a buffer flush controller of a PCI-to-PCI bridge 50, where PCI-to-PCI bridge refers to a peripheral component interconnect bus-to-peripheral component interconnect bus bridge. Also in FIG. 1, there is shown a PCI-to-EISA bus bridge chip (PCEB) 60, where PCI refers to a peripheral component interconnect and EISA refers to an Expanded Industry Standard Architecture. There is also shown an ESC chip 70, where ESC refers to an EISA System Controller. An advanced programmable interconnect controller (APIC) is included within EISA system controller 70. FIG. 1 also shows input/output ports (I/O) 80, an Intel 8042 chip 90 which is a keyboard decoder linking a keyboard to the motherboard, a real time clock (RTC) 100, a flash read only memory (ROM) 110, an EISA static random access memory (SRAM) 120. FIG. 1 illustrates a multiprocessor interconnect bus 130, a first PCI bus 140, a second PCI bus 160, and an EISA bus 150. The first PCI bus 140 has expansion slots 145. The second PCI bus 160 has expansion slots 165. The EISA system controller 70 is connected directly to the central process unit board 10 via line 200. In the present invention, as shown in FIG. 1, two buses are connected to a primary bus. In other words, PCI bus 160 and EISA bus 150 are connected to the primary bus. The primary bus is PCI bus 140. The PCI-PCI bridge 40 couples PCI bus 140 to PCI bus 160. The PCI-EISA bridge 60 couples PCI bus 140 to EISA bus 150. Since two bridges are connected to the primary bus 140, the control for giving master privilige of the master bus to one of the bridges is important. The control is executed by the buffer flush controller 50. FIG. 2 shows a buffer flush controller of a peripheral component interconnect bridge in accordance with the preferred embodiment of the present invention, which can include a first compounding circuit 10 which outputs a buffer flush request signal (also referred to as a bridge flush request signal) of a peripheral component interconnect bridge (PPBFLSHREQ) to the corresponding devices when a first buffer flush request signal (FLSHREQ_) is received from a PCEB or a second buffer flush request signal (AFLUSH_, ESC_) from the ESC and received after an interrupt is produced from an APIC. A first state machine 20 outputs control signals (PPBMEMACK_, SDISPSTA_) to perform the data buffer flush and stop using a data buffer when the buffer flush request signal (also referred to as a bridge flush request signal) of a peripheral component interconnect bridge (PPBFLSHREQ) from the above-mentioned first compounding circuit 10 is received or a first flush finishing signal (SBUFNE_), which shows a flush of the inner buffer of a peripheral component interconnect bridge has been finished, is received. A second state machine 30 outputs control signals (SDISPSTP_, INTEN) to perform a flush of a data buffer of a peripheral component interconnect bridge and stop using the data buffer when a first flush finishing signal (SBUFNE_), showing a flush of a data buffer of a peripheral component interconnect bridge has been finished, is received or an interrupt request signal (INTR) is received. A second compounding circuit 40 outputs a third flush performance signal (SDISPST) and a fourth flush finishing signal (MEMACK_) showing that the buffer flush of a peripheral component interconnect bridge has been finished after compounding control signals (PPBMEMACK_, SDISPSTA_, SDISPSTP_) received from the above-mentioned first state machine 20 and second state machine 30, and a third flush finishing signal (BCUMEMACK_) received from a BCU.

First state machine 20 may include the operational steps of waiting for demands after changing a first flush performance signal (SDISPSTA_) and a second flush finishing signal (PPBMEMACK_) into an inactive state as shown in box S301, determining whether a peripheral component interconnect reset signal (PCIRST_) is in an active state as shown in box S302, determining whether a buffer flush request signal (also referred to as a bridge flush request signal) (PPBFLSHREQ) of a peripheral component interconnect bridge is in an active state as shown in box S303, and changing a first flush performance signal (SIDSPSTA_) into an active state and a second flush finishing signal (PPBMEMACK_) into an inactive state as shown in box S304. The first state machine determines whether a peripheral component interconnect reset signal (PCIRST_) is in an active state as shown in box S305, changes the first flush performance signal (SDISPSTA_) into an active state and second flush finishing signal (PPBMEMACK_) into an inactive state as shown in box S306, determines whether a peripheral component interconnect reset signal (PCIRST_) is in an active state as shown in box S307, changes the above-mentioned first flush performance signal (SDISPSTA_) into an active state and second flush finishing signal (PPBMEMACK_) into an inactive state as shown in box S308, determines whether a peripheral component interconnect reset signal (PCIRST_) is in an active state as shown in box S309, determines whether a first flush finishing signal (SBUFNE_) is in an active state after operations (S306–S309) providing a required time due to a latency of a first flush finishing signal (SBUFNE_) as shown in box SA0, changes a first flush performance signal (SDISPSTA_) and a second flush finishing signal (PPBMEMACK_) into an active state as shown in box SA1, determines whether a peripheral component interconnect reset signal (PCIRST_) is in an active state as shown in box SA2, and determinies,whether a buffer flush request signal (also referred to as a bridge flush request signal) of a peripheral component interconnect bridge (PPBFLSHREQ) is in an active state. A state diagram of a first state machine 20, operating in accordance with these steps, is shown in Table 1.

S405, determining whether an interrupt request signal (INTR) is in an active state as shown in box S406, performing a flush of a data buffer of a peripheral component interconnect bridge and stopping the use of a buffer after changing an interrupt control signal (INTEN) into an inactive state and changing a second flush performance signal (SDISPSTP_) into an active state if an interrupt request signal (INTR) is in an active state after various operations (S404–S406) have been performed in order to keep the above-mentioned interrupt request signal (INTR) from performing an unnecessary flush of a data buffer of a peripheral component interconnect bridge due to line noise as shown in box S407, determining whether a peripheral component interconnect reset signal (PCIRST_) is in an active state as shown in box S408, changing the above-mentioned second flush performance signal (SDISPSTP_) into an active state and the above-mentioned interrupt control signal (INTEN) into an inactive state as shown in box S409, determining whether a peripheral component interconnect reset signal (PCIRST_) is in an active state S4A0, and changing the above-mentioned second flush performance signal (SDISPSTP_) into an active state and the above-mentioned interrupt control signal (INTEN) into an inactive state as shown in box S4A1. The operational steps can further include determining whether a peripheral component interconnect reset signal (PCIRST_) is in an active state as shown in box S4A2, determining whether a first flush finishing signal (SBUFNE_) is in an active state after various operations (S409–S4A2) providing the desired delay

TABLE 1

| I_State | | | INPUT | | | N_State | | | OUTPUT | |
|---|---|---|---|---|---|---|---|---|---|---|
| Q2 | Q1 | Q0 | PCIRST_ | PPBFLSHREQ | SBUFNE_ | Q2 | Q1 | Q0 | SDISPSTSA_ | PPBMEMACK |
|  |  |  | 0 | X | X | 0 | 0 | 0 | 1 | 1 |
| 0 | 0 | 0 | 1 | 0 | X | 0 | 0 | 0 | 1 | 1 |
|  |  |  | 1 | 1 | X | 0 | 1 | 0 | 1 | 1 |
| 0 | 1 | 0 | 0 | X | X | 0 | 0 | 0 | 0 | 1 |
|  |  |  | 1 | X | X | 1 | 1 | 0 | 0 | 1 |
| 1 | 1 | 0 | 0 | X | X | 0 | 0 | 0 | 0 | 1 |
|  |  |  | 1 | X | X | 1 | 0 | 0 | 0 | 1 |
|  |  |  | 0 | X | X | 0 | 0 | 0 | 0 | 1 |
| 1 | 0 | 0 | 1 | X | 0 | 1 | 0 | 1 | 0 | 1 |
|  |  |  | 1 | X | 1 | 1 | 0 | 0 | 0 | 1 |
|  |  |  | 0 | X | X | 0 | 0 | 0 | 0 | 0 |
| 1 | 0 | 1 | 1 | 0 | X | 0 | 0 | 0 | 0 | 0 |
|  |  |  | 1 | 1 | X | 1 | 0 | 1 | 0 | 0 |

An operation of the second state machine 30 can include the operational steps of waiting for commands after changing a second flush performance signal (SDISPSTP_) and an interrupt control signal (INTEN) into an inactive state as shown in box S401, determining whether a peripheral component interconnect reset signal (PCIRST_) is in an active state as shown in box S402, determining whether an interrupt request signal (INTR) is in an inactive state as shown in box S403, and waiting for commands after changing a second flush performance signal (SDISPSTP_) and an interrupt control signal (INTEN) into an inactive state as shown in box S404. Other operational steps can include determining whether a peripheral component interconnect reset signal (PCIRST_) is in an active state as shown in box time due to the latency of a first flush finishing signal (SBUFNE_) as shown in box S4A3, informing that a flush of a data buffer of a peripheral component interconnect bridge has been finished after changing a second flush performance signal into an active state and changing an interrupt control signal (INTEN) into an active state as shown in box S4A4, determining whether a peripheral component interconnect reset signal (PCIRST_) is in an active state as shown in box S4A5, and determining whether an interrupt request signal (INTR) is in an active state as shown in box S4A6. A state diagram of second state machine 30, operating in this manner, is as in Table 2.

TABLE 2

| I_State | INPUT | N_State | OUTPUT |
|---|---|---|---|

| P2 | P1 | P0 | PCIRST_ | INTR | SBUFNE | P2 | P1 | P0 | SDISPSTP_ | INTEN |
|---|---|---|---|---|---|---|---|---|---|---|
|   |   |   | 0 | X | X | 0 | 0 | 0 | 1 | 0 |
| 0 | 0 | 0 | 1 | 0 | X | 0 | 0 | 0 | 1 | 0 |
|   |   |   | 1 | 1 | X | 0 | 1 | 0 | 1 | 0 |
|   |   |   | 0 | X | X | 0 | 0 | 0 | 1 | 0 |
| 0 | 1 | 0 | 1 | 0 | X | 0 | 0 | 0 | 1 | 0 |
|   |   |   | 1 | 1 | X | 0 | 1 | 1 | 1 | 0 |
| 0 | 1 | 1 | 0 | X | X | 0 | 0 | 0 | 0 | 0 |
|   |   |   | 1 | X | X | 1 | 1 | 1 | 0 | 0 |
| 1 | 1 | 1 | 0 | X | X | 0 | 0 | 0 | 0 | 0 |
|   |   |   | 1 | X | X | 1 | 1 | 0 | 0 | 0 |
|   |   |   | 0 | X | X | 0 | 0 | 0 | 0 | 0 |
| 1 | 1 | 0 | 1 | X | 0 | 1 | 0 | 0 | 0 | 0 |
|   |   |   | 1 | X | 1 | 1 | 1 | 0 | 0 | 0 |
|   |   |   | 0 | X | X | 0 | 0 | 0 | 0 | 1 |
| 1 | 0 | 0 | 1 | 0 | X | 0 | 0 | 0 | 0 | 1 |
|   |   |   | 1 | 1 | X | 1 | 0 | 0 | 0 | 1 |

Some of the functional features of a buffer flush controller in a peripheral component interconnect-peripheral component interconnect bridge in accordance with a preferred embodiment of the present invention are as follows. A computer system can operate in an APIC mode as follows. In situations that a flush request of a data buffer of a peripheral component interconnect bridge is produced when a computer system operates in APIC mode, the following may occur. First, a flush of a posted write buffer in all peripheral component interconnect systems must be performed before EISA/ISA master or direct memory access (DMA) performs peripheral component interconnect control at a state that APIC interrupt is not produced. Second, because EISA producing cycle can access a main memory on a HOST/PCI bridge, the EISA/ISA master or DMA waiting for adjusting a HOST/PCI bridge can enter a latency which is longer than a 2.1 $\mu$s timing specification of a test preparation of EISA/ISA. At this time, the above-mentioned timing specification 2.1 $\mu$s must not be violated when a PCEB operates in a guaranteed access time (GAT). A PCEB buffer flush and a buffer flush of a peripheral component interconnect bridge must be performed before EISA/ISA master or DMA can access an EISA/ISA bus. Third, the flush of all data buffers of a system must be performed before an interrupt vector value is transmitted to a local APIC through an APIC bus at a state that an APIC interrupt is produced.

The buffer flush request production is summarized in Table 3.

ishing signal (PPBMEMACK_) into an inactive state as shown in box S300–S301.

At this time, the above-mentioned first compounding circuit 10 outputs a buffer flush request signal (also referred to as a bridge flush request signal) of a peripheral component interconnect bridge (PPBFLSHREQ) which requests a flush of a data buffer of a peripheral component interconnect bridge if either a first buffer flush request signal (FLSHREQ_) is received from a PCEB or a second flush request signal (AFLUSH_ESC_) from the ESC and received after an interrupt is produced from an APIC. The above-mentioned first state machine 20 monitors a buffer flush request signal of a peripheral component interconnect bridge (PPBFLSHREQ) from a first compounding circuit 10. And, when the above-mentioned signal (PPBFLSHREQ) is received, it outputs a second flush finishing signal (PPBMEMACK_) which is in an inactive state and a first flush performance signal (SDISPSTA_) which has been changed into an active state to a second compounding circuit 40.

A second compounding circuit 40 outputs a third flush performance signal (SDISPST_) to a peripheral component interconnect bridge after compounding a first flush performance signal (SDISPSTA_) from a first state machine 20. Afterwards, the above-mentioned second compounding circuit 40 maintains data consistency of a posted write buffer, a lead buffer and a line buffer after a flush of a data buffer of a peripheral component interconnect bridge has been

TABLE 3

| Input | | | Output | |
|---|---|---|---|---|
| Flush Request Signal (FLSHREQ_) | Memory Request (MEMREQ_) | AFLUSH-ESC | Flush Request Signal (FLUSH_REQ) | Explanation |
| 0 | 0 | 1 | 1 | GAT mode |
| 0 | 0 | 0 | 1 | APIC FLUSH Request is produced under GAT mode |
| 0 | 1 | X | 1 | Flush of a buffer to avoid ISA deadlock |
| 1 | 0 | 0 | 1 | APIC Flush |
| 1 | 1 | 1 | 0 | IDLE |

The operation of a computer system under a APIC mode is as follows. The above-mentioned first state machine 20 ensures a normal function of a data buffer of a peripheral component interconnect bridge by changing a first flush performance signal (SDISPSTA_) and a second flush finishing at an inactive state of a second flush finishing signal (PPBMEMACK) as shown in box S302–S305.

A first state machine 20 maintains an active state of the above-mentioned first flush performance signal (SDISPSTA_) and an inactive state of a second flush finishing signal (PPBMEMACK_). And the above-mentioned first state machine 20 provides a delay time which is necessary for a latency of a first flush finishing signal (SBUFNE_) informing that a flush of a data buffer of a peripheral component interconnect bridge has been finished as shown in box S306–S309.

The first state machine 20 maintains an active state of a first flush performance signal (SDISPSTA_) after a first flush finishing signal (SBUFNE_) is from a peripheral component interconnect bridge. And the above first state machine 20 changes a second flush finishing signal (PPBMEMACK_) informing that a flush of a data buffer of a peripheral component interconnect bridge has been finished and a data buffer is not used any longer as shown in box S3A0–S3A1.

At this time, if a third flush finishing signal (BCUMEMACK_) being in an active state is received from a BCU, the above-mentioned second compounding circuit 40 outputs a fourth flush finishing signal (MEMACK_) after compounding a third flush finishing signal (BCUMEMAC_) and a second flush finishing signal (PPBMEMACK_) in an active state which is received from the above-mentioned first state machine 20.

The first state machine 20 examines again whether a buffer flush request signal of a peripheral component interconnect bridge (PPBFLSHREQ) is from a first compounding circuit 10 after the above-mentioned first flush performance signal (SDISPSTA_) and second flush finishing signal (PPBMEMACK_) have been changed into an active state. If there is not a buffer flush request signal of a peripheral component interconnect bridge (PPBFLSHREQ_) in the above-mentioned first compounding circuit 10, a first flush performance signal (SDISPSTA_) and a second flush finishing signal (PPBMEMACK_) is changed into an inactive state, and a data buffer of a peripheral component interconnect bridge performs a normal function. But, if a buffer flush request signal of a peripheral component interconnect bridge (PPBFLSHREQ) is from the above-mentioned first compounding circuit 10, a first state machine 20 maintains an active state of a first flush performance signal (SDISPSTA_) and an inactive state of a second flush finishing signal (PPBMEMACK_) informing that a flush of a data buffer of a peripheral component interconnect bridge has been finished and the function of a data buffer has been stopped, and examines whether a buffer flush request signal of a peripheral component interconnect bridge (PPBFLSHREQ) is from a first compounding circuit 10. If a peripheral component interconnect reset signal (PCIRST_) is from a peripheral component interconnect bridge during the above-mentioned operations, all operations of a first state machine 20 are changed so that a first flush performance signal (SDISPSTA_) and a second flush finishing signal (PPBMEMACK_) being an output signal may be changed into an inactive state, and a data buffer of a peripheral component interconnect bridge may perform a normal function.

Next, a situation of a computer system operating in a programmable interrupt mode (a peripheral component interconnect mode) follows. When a system operates in a peripheral component interconnect mode, a flush request of a data buffer of a peripheral component interconnect bridge is produced in the following situations. In a situation that a computer system operates in a peripheral component interconnect mode, if an interrupt request signal (INTR) is received to a central process unit, a BCU reads an interrupt vector from the ESC and performs an interrupt service after generating an interrupt admittance signal among peripheral component interconnect bus specifications and performing an inner data buffer of a BCU and a PCEB. Because a peripheral component interconnect bridge ignores an interrupt admittance cycle, a flush of a data buffer of a peripheral component interconnect bridge must be performed before an interrupt request signal (INTR) reaches a central process unit.

An operation of a computer system in a peripheral component interconnect mode is as follows. A second state machine 30 enables a normal operation of a data buffer after changing a second flush performance signal (SDISPSTP_) into an inactive state in an early stage, and prevents an interrupt request signal (INTR) from reaching a central process unit after changing an interrupt control signal (INTEN) into an inactive state as shown in box S400–S402.

A second state machine 30 maintains an inactive state of a second flush performance signal (SDISPSTP_) and an interrupt control signal (INTEN) when an interrupt request signal (INTR) is in an inactive state, and examines an interrupt request signal once again in order to prevent an interrupt request signal (INTR) from performing an unnecessary flush of a data buffer of a peripheral component interconnect bridge due to line noise while it is maintaining an inactive state of a second flush performance signal (SDISPSTP_) and an interrupt control signal (INTEN) when an interrupt request signal (INTR) is in an inactive state as shown in box S403–S406.

After this test, the above-mentioned second state machine 30 prevents an interrupt request signal (INTR) from reaching a central process unit after maintaining an inactive state of an interrupt control signal (INTEN) if an interrupt request signal (INTR) is in an active state, and outputs it after changing a second flush performance signal (SDSIPSTP_) into an active state as shown in box S408.

At this time, a second compounding circuit 40 performs a flush of a data buffer of a peripheral component interconnect bridge and stops the use of a buffer before an interrupt request signal (INTR) is received to a central process unit after generating a third flush performance signal (SDISPST_) to a peripheral component interconnect bridge and receiving a second flush performance signal (SDISPSTP_) from a second state machine 30. As a result, the consistency of a posted write buffer data, a lead buffer data, and a line buffer data can be maintained.

In a second state machine 30, a second flush performance signal (SDISPSTP_) is in an active state and an interrupt control signal (INTEN) is in an inactive state. The above-mentioned second state machine 30 requires a delay time due to a latency of a first flush finishing signal (SBUFNE_) informing that a flush of a data buffer of a peripheral component interconnect bridge has been finished. In order to provide the above-mentioned delay time, a second state machine 30 maintains an active state of the above-mentioned second flush performance signal (SDISPSTP_) and an inactive state of an interrupt control signal (INTEN) as shown in box S409–S4A2.

If a first flush finishing signal (SBUFNE_) is outputted, a second state machine 30 maintains an active state of a second flush performance signal (SDISPSTP_), and transmits an interrupt request signal (INTR) to a central process unit after changing an interrupt control signal (INTEN) into an active state as shown in box S4A3–S4A5.

A second state machine 30 wherein the above-mentioned second flush performance signal (SDISPSTP_) is in an active state and an interrupt control signal (INTEN) is in an active state examines again whether an interrupt request signal (INTR) is outputted. The above-mentioned second state machine 30 changes a flush request signal and an interrupt control signal (INTEN) into an inactive state if an interrupt request signal (INTR) has not been outputted after a test of the above-mentioned interrupt request signal (INTR). As a result, a data buffer of a peripheral component interconnect bridge can perform a normal operation. But, if an interrupt request signal (INTR) is outputted, a second state machine 30 maintains an active state of the above-mentioned second flush performance signal (SDISPSTP__) and an interrupt control signal (INTEN), and transmits an interrupt request signal (INTR) to a central process unit. And the above-mentioned second state machine 30 examines again whether an interrupt request signal (INTR) is outputted as shown in box S4A6.

If a peripheral component interconnect reset signal (PCIRST__) is from a peripheral component bridge during the above-mentioned operations, all operations of a second state machine 30 are changed into a state wherein an data buffer can perform a normal operation after changing the early second flush performance signal (SDISPSTP__) into an inactive state, and an interrupt request signal (INTR) can not reach a central process unit after changing an interrupt control signal (INTEN) into an inactive state.

An example of an operating program in a peripheral component interconnect-peripheral component interconnect bridge buffer flush control device, which operates in a similar fashion as above, is as follows. In this program, active states of signals corresponding to peripheral component interconnect bridge FLSHREQ__, INTEN, and INTR occur when the signal is at "1." In this program, active states of other signals occur when the signal is at "0."

```
DECLARATION;
    PPBFLSH device 'P22V 10';
    PCICLK, PCIRSTL, FLSHREQL    pin 1, 2, 3;
    AFLUSHL, SBUFNEL, BCUMACKL    pin 4, 5, 6;
    MEMREQL, INTR, NMFLSHREQL    pin 7, 8, 9;
    EISAHOLD, EISAHODA    pin 10, 11;
    INTEN, P0,P1,P2    pin 15, 16, 17, 18 istype 'reg';
    Q0, Q1, Q2    pin 19, 20, 21    istype 'reg';
    MEMACKL, SDISPSTL    pin 22, 23    istype 'invert';
    SDISPSTAL, SDISPSTPS, PPBMACKL    node istype 'feed__reg';
    H, L, CK, X = 1, 0, .C., .X.;
PPBFLSHREQ = !FLSHREQL # !AFLUSHL;
APICM = [Q2, Q1, Q0];
AIDLE =   ^b000;
AASS__DP =   ^b010;
AWAIT__BNE =   ^b110;
ASAMPLE__BNE =   ^b100;
AFLUSHLOK =   ^b101;
PICM = [P2, P1, P0];
PIDLE =   ^b000;
PGLITCH =   ^b010;
PASS__DP =   ^b011;
PWAIT__BNE =   ^b111;
PSAMPLE__BNE =   ^b110;
PFWA__INT =   ^b100;
[Q2, Q1, Q0].C = PCICLK;
[P2, P1, P0].C = PCICLK;
EQUATIONS;
  MEMACKL = BCUMACKL # PPBMACKL;
  SDISPSTL = SDISPSTAL * SDISPSTPL;
STATE__DIAGRAM APICM;
  State AIDLE : SDISPSTAL = 1;
       PPBMACKL = 1;
       IF(!PCIRSTL) THEN AIDLE;
          ELSE IF (PPBFLSHREQ) THEN AASS__DP;
          ELSE AIDLE;
  State AASS__DP : SDISPSTAL = 0;
       PPBMACKL = 1;
       IF (!PCIRSTL) THEN AIDLE;
```

-continued
```
          ELSE AWAIT__BNE;
  State AWAIT__BNE : SDISPSTAL = 0;
       PPBMACKL = 1;
       IF (!PCIRSTL) THEN AIDLE;
          ELSE ASAMPLE__BNE;
  State ASAMPLE__BNE : SDISPSTAL = 0;
       PPBMACKL = 1;
       IF (!PCIRSTL) THEN AIDLE;
          ELSE IF (!SBUFNEL) THEN
AFLUSHOK;
          ELSE ASAMPLE__BNE;
  State AFLUSHOK : SDISPSTAL = 0;
       PPBMACKL = 0;
       IF (!PCIRSTL) THEN AIDLE;
          ELSE IF (PPBFLSHREQ) THEN
AFLUSHOK;
          ELSE AIDLE;
STATE__DIAGRAM PCIM;
  State PIDLE : SDISPSTPL = 1;
       INTEN = 0;
       IF (!PCIRSTL) THEN PIDLE;
          ELSE IF (INTR) THEN PGLITCH;
          ELSE PIDLE;
  State PGLITCH : SDISPSTPL = 1;
       INTEN = 0;
       IF (!PCIRSTL) THEN PIDLE;
          ELSE IF (INTR) THEN PASS__DP;
          ELSE PIDLE;
  State PASS__DP : SDISPSTPL = 0;
       INTEN = 0;
       IF (!PCIRSTL) THEN PIDLE;
          ELSE PWAIT__BNE;
  State PWAIT__BNE : SDISPSTPL = 0;
       INTEN = 0;
       IF (!PCIRSTL) THEN PIDLE;
          ELSE PSAMPLE__BNE;
  State PSAMPLE__BNE : SDISPSTPL = 0;
       INTEN = 0;
       IF (!PCIRSTL) THEN PIDLE;
          ELSE IF (!SBUFNEL) THEN
PFWA__INT;
          ELSE PSAMPLE__BNE;
  State PFWA__INT : SDISPSTPL = 0;
       INTEN = 1;
       IF (!PCIRSTL) THEN PIDLE;
          ELSE IF (INTR) THEN PFWA__INT;
          ELSE PIDLE;
END
```

As discussed in the previous paragraphs, this program is designed to be used with a device built according to the principles of the invention. As discussed in the previous paragraphs, this present invention can concern a buffer flush controller of a peripheral component interconnect-peripheral component interconnect bridge. This buffer controller can include a first compounding circuit outputting a bridge flush request signal (also referred to as a buffer flush request signal) of the peripheral component interconnect-peripheral component interconnect bridge to a corresponding device when either a first buffer flush signal is received from a peripheral component interconnect-EISA bridge or a second buffer flush signal is received from an EISA system controller after an interrupt is generated by an advanced programmable interrupt controller. A first state machine is used for outputting control signals to perform a flush of a data buffer and stop using a data buffer when the bridge flush request signal of the peripheral component interconnect-peripheral component interconnect bridge from said first compounding circuit is received or an first flush finishing signal, showing the flush of the inner buffer in a peripheral component interconnect-peripheral component interconnect bridge has been finished, is received. A second state machine is used for outputting control signals to perform a flush of a data buffer of a peripheral component interconnect-peripheral component interconnect bridge and stop using the data buffer when a first flush finishing signal, showing the flush of the data buffer in a peripheral component interconnect-peripheral component interconnect bridge has been finished is received or an interrupt request signal, is received. A second compounding circuit is used for outputting a third flush performance signal and a fourth flush finishing signal showing that a buffer flush of a peripheral component interconnect-peripheral component interconnect bridge has been finished after compounding control signals received from said first state machine and second state machine, and a third flush finishing signal received from a bus controller unit. The operation of the first state machine may include the operational steps of determining whether a bridge flush request signal of the peripheral component interconnect-peripheral component interconnect bridge is in an active state after changing a first flush performance signal and a second flush finishing signal into an inactive state, waiting for an active state of a first flush finishing signal while changing a first flush performance signal into an active state and maintaining an inactive state of a second flush finishing signal, determining whether a first flush finishing signal is in an active signal after maintaining an active state of said first flush performance signal and an inactive state of said second flush finishing signal, and providing a required delay time due to a latency of a first flush finishing signal, changing a first flush performance signal and a second flush finishing signal into an active state, and determining whether a bridge flush request signal of the peripheral component interconnect-peripheral component interconnect bridge is in an active state. The operation of the second state machine may include the operational steps of determining whether an interrupt request signal is in an active state after changing a second flush performance signal and an interrupt control signal into an inactive state, and keeping an interrupt request signal in an active state due to line noise, changing a second flush performance signal and an interrupt control signal into an inactive state, performing a flush of a peripheral component interconnect-peripheral component interconnect bridge data buffer and stopping the use of a buffer after maintaining an inactive state of an interrupt control signal and changing a second flush performance signal into an active state if an interrupt request signal is an active state after various operations have been performed in order to keep said interrupt request signal from performing an unnecessary flush of a peripheral component interconnect-peripheral component interconnect bridge data buffer due to line noise, waiting for an active state of a first flush finishing signal, determining whether a first flush finishing signal is in an active state after operations providing a required delay time due to a latency of a first flush finishing signal while maintaining an active state of said second flush performance signal and an inactive state of said interrupt control signal, permitting an interrupt request signal to reach a central process unit after a data buffer flush of a peripheral component interconnect-peripheral component interconnect bridge has been finished by maintaining an active state of a second flush performance and changing an interrupt control signal into an active state, and determining whether an interrupt request signal is an active state in order to determine the time when an interrupt request signal is finished.

Accordingly, one effect of the present invention may lie in the buffer flush controller of a peripheral component interconnect bridge maintaining data consistency by efficiently controlling a flush operation of a data buffer inside a peripheral component interconnect bridge. Also, the present invention may ensure a normal system operation without deadlock.

What is claimed is:

1. A buffer flush controller of a peripheral component interconnect-peripheral component interconnect bridge, comprising:

a first compounding circuit outputting a bridge flush request signal of the peripheral component interconnect-peripheral component interconnect bridge, the bridge flush request signal being outputted to a corresponding device, said first compounding circuit outputting the bridge flush request signal when a first buffer flush signal is received from a first bridge of peripheral component interconnect-Extended Industry Standards Architecture connection, said first compounding circuit outputting the bridge flush request signal when a second buffer flush signal is from a system controller of a Extended Industry Standards Architecture system and is received after an interrupt is from an interrupt controller of an advanced programmable interrupt control;

a first state machine outputting first and second control signals to perform a flush of a data buffer, said first state machine stopping use of a data buffer when the bridge flush request signal from said first compounding circuit is received, said first state machine stopping use of the data buffer when a first flush finishing signal is received, the first flush finishing signal indicating that a flush of an inner buffer in the peripheral component interconnect-peripheral component interconnect bridge has been finished, wherein said first state machine operates with the operational steps of:

changing a first flush performance signal and a second flush finishing signal into being at inactive state levels;

determining whether the bridge flush request signal of the peripheral component interconnect-peripheral component interconnect bridge is at active state level after changing the first flush performance signal and the second flush finishing signal into being at inactive state levels;

waiting for the first flush finishing signal to be at active state level while changing the first flush performance signal to being at active state level and while maintaining the second flush finishing signal at inactive state level;

determining whether a first flush finishing signal is in an active signal after maintaining an active state of said first flush performance signal and an inactive state of said second flush finishing signal, and providing a required delay time due to a latency of a first flush finishing signal;

changing the first flush performance signal and the second flush finishing signal to being at active state levels; and determining whether the bridge flush request signal of the peripheral component interconnect-peripheral component interconnect bridge is at active state level;

a second state machine outputting third and fourth control signals to perform a flush of the data buffer of the peripheral component interconnect-peripheral component interconnect bridge, said second state machine stopping use of the data buffer when the first flush finishing signal is received, said second state machine stopping use of the data buffer when an interrupt request signal is received, wherein said second state machine operates with the operational steps of:

determining whether an interrupt request signal is at active state level after changing a second flush performance signal and an interrupt control signal to inactive state level;

maintaining an interrupt request signal at active state level;

changing the second flush performance signal and the interrupt control signal to being at inactive state levels;

maintaining the interrupt request signal so as to prevent performing an unnecessary flush of the data buffer due to line noise;

maintaining the interrupt control signal at inactive state level if the interrupt request signal is at active state level and changing the second flush performance signal to being at active state level if the interrupt request signal is at active state level;

performing a flush of the data buffer and stopping the use of the data buffer;

waiting for the first flush finishing signal to be at active state level;

determining whether the first flush finishing signal is at active state level after operations providing a required delay time due to a latency of the first flush finishing signal, while maintaining the second flush performance signal to be at active state level and maintaining the interrupt control signal to be at inactive state level;

permitting the interrupt request signal to reach a central process unit after the flush of the data buffer has been finished;

maintaining the second flush performance signal to be at active state level and changing the interrupt control signal to be at active state level;

determining whether the interrupt request signal is at active state level and determining time when the interrupt request signal is finished in dependence upon whether the interrupt request signal is at active state level; and a second compounding circuit outputting a third flush performance signal and a fourth flush finishing signal, said flush performance signal and said fourth flush finishing signal indicating that a buffer flush of the peripheral component interconnect-peripheral component interconnect bridge has been finished after compounding of said control signals received from said first state machine and second state machine and after compounding of a third flush finishing signal received from a bus controller unit.

2. A buffer flush controller of a peripheral component interconnect-peripheral component interconnect bridge, comprising:

a first compounding means for outputting a bridge flush request signal of the peripheral component interconnect-peripheral component interconnect bridge, the bridge flush request signal being outputted to a corresponding device, said first compounding circuit outputting the bridge flush request signal when a first buffer flush signal is received from a first bridge of peripheral component interconnect-Extended Industry Standards Architecture connection, said first compounding circuit outputting the bridge flush request signal when a second buffer flush signal is from a system controller of a Extended Industry Standards Architecture system and is received after an interrupt is from an interrupt controller of an advanced programmable interrupt control;

a first state means for outputting control signals to perform a flush of a data buffer, said first state machine stopping use of a data buffer when the bridge flush request signal from said first compounding circuit is received, said first state machine stopping use of the data buffer when a first flush finishing signal is received, the first flush finishing signal indicating that a flush of an inner buffer in the peripheral component interconnect-peripheral component interconnect bridge has been finished;

a second state means for outputting control signals to perform a flush of the data buffer of the peripheral component interconnect-peripheral component interconnect bridge, said second state machine stopping use of the data buffer when the first flush finishing signal is received, said second state machine stopping use of the data buffer when an interrupt request signal is received; and a second compounding means for outputting a third flush performance signal and a fourth flush finishing signal, said flush performance signal and said fourth flush finishing signal indicating that a buffer flush of the peripheral component interconnect-peripheral component interconnect bridge has been finished after compounding of said control signals received from said first state machine and second state machine and after compounding of a third flush finishing signal received from a bus controller unit.

3. A buffer flush controller of a peripheral component interconnect-peripheral component interconnect bridge, comprising:

a first compounding circuit outputting a bridge flush request signal of the peripheral component interconnect-peripheral component interconnect bridge, the bridge flush request signal being outputted to a corresponding device, said first compounding circuit outputting the bridge flush request signal when a first buffer flush signal is received from a first bridge of peripheral component interconnect-Extended Industry Standards Architecture connection, said first compounding circuit outputting the bridge flush request signal when a second buffer flush signal is from a system controller of a Extended Industry Standards Architecture system and is received after an interrupt is from an interrupt controller of an advanced programmable interrupt control;

a first state machine outputting first and second control signals to perform a flush of a data buffer, said first state machine stopping use of a data buffer when the bridge flush request signal from said first compounding circuit is received, said first state machine stopping use of the data buffer when a first flush finishing signal is received, the first flush finishing signal indicating that a flush of an inner buffer in the peripheral component interconnect-peripheral component interconnect bridge has been finished;

a second state machine outputting third and fourth control signals to perform a flush of the data buffer of the peripheral component interconnect-peripheral component interconnect bridge, said second state machine stopping use of the data buffer when the first flush finishing signal is received, said second state machine stopping use of the data buffer when an interrupt request signal is received;

a second compounding circuit outputting a third flush performance signal and a fourth flush finishing signal, said flush performance signal and said fourth flush finishing signal indicating that a buffer flush of the peripheral component interconnect-peripheral component interconnect bridge has been finished after compounding of said control signals received from said first state machine and second state machine and after compounding of a third flush finishing signal received from a bus controller unit;

said buffer flush controller being connected to a direct memory access and the buffer flush controller permitting a direct memory access to have a latency of a period greater than a period of test preparation of Extended Industry Standards Architecture; and said flush of the data buffer being performed before the direct memory access can access an Extended Industry Standards Architecture bus.

4. The buffer flush controller of claim 3, with said first state machine operating with the operational steps of:

changing a first flush performance signal and a second flush finishing signal into being at inactive state levels;

determining whether the bridge flush request signal of the peripheral component interconnect-peripheral component interconnect bridge is at active state level after changing the first flush performance signal and the second flush finishing signal into being at inactive state levels;

waiting for the first flush finishing signal to be at active state level while changing the first flush performance signal to being at active state level and while maintaining the second flush finishing signal at inactive state level;

determining whether a first flush finishing signal is in an active signal after maintaining an active state of said first flush performance signal and an inactive state of said second flush finishing signal, and providing a required delay time due to a latency of a first flush finishing signal;

changing the first flush performance signal and the second flush finishing signal to being at active state levels; and determining whether the bridge flush request signal of the peripheral component interconnect-peripheral component interconnect bridge is at active state level.

5. The buffer flush controller of claim 3, with said second state machine operating with the operational steps of:

determining whether an interrupt request signal is at active state level after changing a second flush performance signal and an interrupt control signal to inactive state level;

maintaining an interrupt request signal at active state level;

changing the second flush performance signal and the interrupt control signal to being at inactive state levels;

maintaining the interrupt request signal so as to prevent performing an unnecessary flush of the data buffer due to line noise;

maintaining the interrupt control signal at inactive state level if the interrupt request signal is at active state level and changing the second flush performance signal to being at active state level if the interrupt request signal is at active state level;

performing a flush of the data buffer and stopping the use of the data buffer;

waiting for the first flush finishing signal to be at active state level;

determining whether the first flush finishing signal is at active state level after operations providing a required delay time due to a latency of the first flush finishing signal, while maintaining the second flush performance signal to be at active state level and maintaining the interrupt control signal to be at inactive state level;

permitting the interrupt request signal to reach a central process unit after the flush of the data buffer has been finished;

maintaining the second flush performance signal to be at active state level and changing the interrupt control signal to be at active state level;

determining whether the interrupt request signal is at active state level and determining time when the interrupt request signal is finished in dependence upon whether the interrupt request signal is at active state level.

6. The buffer flush controller of claim 3, with said first state machine operating with the operational step of providing a required delay time due to a latency of a first flush finishing signal.

7. The buffer flush controller of claim 3, with said first state machine operating with the operational steps of:

changing a first flush performance signal and a second flush finishing signal into being at inactive state levels;

determining whether the bridge flush request signal of the peripheral component interconnect-peripheral component interconnect bridge is at active state level after changing the first flush performance signal and the second flush finishing signal into being at inactive state levels;

waiting for the first flush finishing signal to be at active state level while changing the first flush performance signal to being at active state level and while maintaining the second flush finishing signal at inactive state level;

determining whether a first flush finishing signal is in an active signal after maintaining an active state of said first flush performance signal and an inactive state of said second flush finishing signal;

changing the first flush performance signal and the second flush finishing signal to being at active state levels; and determining whether the bridge flush request signal of the peripheral component interconnect-peripheral component interconnect bridge is at active state level.

8. The buffer flush controller of claim 3, with said second state machine operating with the operational steps of:

maintaining the interrupt request signal so as to prevent performing an unnecessary flush of the data buffer due to line noise;

performing a flush of the data buffer and stopping the use of the data buffer;

determining whether the first flush finishing signal is at active state level after operations providing a required delay time due to a latency of the first flush finishing signal; and permitting the interrupt request signal to reach a central process unit after the flush of the data buffer has been finished.

9. The buffer flush controller of claim 3, with said second state machine operating with the operational steps of:

determining whether an interrupt request signal is at active state level after changing a second flush performance signal and an interrupt control signal to inactive state level;

maintaining an interrupt request signal at active state level;

changing the second flush performance signal and the interrupt control signal to being at inactive state levels;

maintaining the interrupt control signal at inactive state level if the interrupt request signal is at active state level and changing the second flush performance signal to being at active state level if the interrupt request signal is at active state level;

waiting for the first flush finishing signal to be at active state level;

maintaining the second flush performance signal to be at active state level and changing the interrupt control signal to be at active state level;

determining whether the interrupt request signal is at active state level and determining time when the interrupt request signal is finished in dependence upon whether the interrupt request signal is at active state level.

10. The buffer flush controller of claim 3, with the first control signal of said first state machine being the first flush performance signal and the second control signal of said first state machine being the second flush finishing signal.

11. The buffer flush controller of claim 3, with the third control signal of said second state machine being the interrupt control signal and the fourth control signal of said second state machine being the second flush performance signal.

12. The buffer flush controller of claim 3, with the buffer flush controller being connected to the central process unit via a bus control unit and being connected to a memory device via the bus control unit.

13. The buffer flush controller of claim 3, wherein if an interrupt of the advanced programmable interrupt controller is produced, the flush of the data buffer is performed before an interrupt vector value is transmitted to the advanced programmable interrupt controller.

14. The buffer flush controller of claim 3, wherein if an interrupt of the advanced programmable interrupt controller is not produced, the flush of the data buffer is performed before a direct memory access performs a peripheral component interconnect control.

15. A buffer flush controller of a peripheral component interconnect-peripheral component interconnect bridge comprising:

a first compounding circuit outputting a bridge flush request signal of the peripheral component interconnect-peripheral component interconnect bridge, the bridge flush request signal being outputted to a corresponding device, said first compounding circuit outputting the bridge flush request signal when a first buffer flush signal is received from a first bridge of peripheral component interconnect-Extended Industry Standards Architecture connection, said first compounding circuit outputting the bridge flush request signal when a second buffer flush signal is from a system controller of a Extended Industry Standards Architecture system and is received after an interrupt is from an interrupt controller of an advanced programmable interrupt control;

a first state machine outputting first and second control signals to perform a flush of a data buffer, said first state machine stopping use of a data buffer when the bridge flush request signal from said first compounding circuit is received, said first state machine stopping use of the data buffer when a first flush finishing signal is received, the first flush finishing signal indicating that a flush of an inner buffer in the peripheral component interconnect-peripheral component interconnect bridge has been finished;

a second state machine outputting third and fourth control signals to perform a flush of the data buffer of the peripheral component interconnect-peripheral component interconnect bridge, said second state machine stopping use of the data buffer when the first flush finishing signal is received, said second state machine stopping use of the data buffer when an interrupt request signal is received;

a second compounding circuit outputting a third flush performance signal and a fourth flush finishing signal, said flush performance signal and said fourth flush finishing signal indicating that a buffer flush of the peripheral component interconnect-peripheral component interconnect bridge has been finished after compounding of said control signals received from said first state machine and second state machine and after compounding of a third flush finishing signal received from a first bus control unit;

said buffer flush controller being connected to a central process unit via a second bus control unit and being connected to a memory device via the second bus control unit; and when the interrupt signal is received to the central process unit, the second bus control unit reads an interrupt vector from the system controller of the Extended Industry Standards Architecture system and performs an interrupt service.

16. A buffer flush controller of a peripheral component interconnect bus bridge circuit, comprising:

a first compounding circuit outputting a bridge flush request signal of the peripheral component interconnect bus bridge circuit, the bridge flush request signal being outputted to a corresponding device, said first compounding circuit outputting the bridge flush request signal when a first buffer flush signal is received from a first bridge circuit of a peripheral component interconnect bus-Extended Industry Standards Architecture bus connection, said first compounding circuit outputting the bridge flush request signal when a second buffer flush signal is received from a system controller of an Extended Industry Standards Architecture system after an interrupt is generated from an interrupt controller of an advanced programmable interrupt controller;

a first state machine outputting first and second control signals to perform a flush of a first data buffer, said first state machine flushing the first data buffer and stopping use of the first data buffer when the bridge flush request signal from said first compounding circuit is received, said first state machine flushing the first data buffer and stopping use of the first data buffer when a first flush finishing signal is received, the first flush finishing signal indicating that a flush of a second data buffer in the peripheral component interconnect bus bridge circuit has been finished;

a second state machine outputting third and fourth control signals to perform a flush of a third data buffer of the peripheral component interconnect bus bridge circuit, said second state machine flushing the third data buffer and stopping use of the third data buffer when the first flush finishing signal is received, said second state machine flushing the third data buffer and stopping use of the third data buffer when an interrupt request signal is received; and a second compounding circuit outputting a primary flush performance signal and a third flush finishing signal, said flush performance signal and said third flush finishing signal indicating that a buffer flush of the peripheral component interconnect bus bridge circuit has been finished after compounding said first, second, and third control signals received from said first state machine and second state machine with a third flush finishing signal received from a bus controller unit.

17. The buffer flush controller of claim 16, with said first state machine operating with the operational steps of:

changing a first flush performance signal and a second flush finishing signal into being at inactive state levels;

determining whether the bridge flush request signal of the peripheral component interconnect bus bridge circuit is at active state level after changing the first flush performance signal and the second flush finishing signal into being at inactive state levels;

waiting for the first flush finishing signal to be at active state level while changing the first flush performance signal to being at active state level and while maintaining the second flush finishing signal at inactive state level;

determining whether a first flush finishing signal is in an active signal after maintaining an active state of said first flush performance signal and an inactive state of said second flush finishing signal, and providing a required delay time due to a latency of a first flush finishing signal;

changing the first flush performance signal and the second flush finishing signal to being at active state levels; and determining whether the bridge flush request signal of the peripheral component interconnect bus bridge circuit is at active state level.

18. The buffer flush controller of claim 16, with said second state machine operating with the operational steps of:

determining whether the interrupt request signal is at active state level after changing a second flush performance signal and an interrupt control signal to inactive state level;

maintaining the interrupt request signal at active state level;

changing a second flush performance signal and the interrupt control signal to being at inactive state levels;

maintaining the interrupt request signal so as to prevent performing an unnecessary flush of the third data buffer due to line noise;

maintaining the interrupt control signal at inactive state level if the interrupt request signal is at active state level and changing the second flush performance signal to being at active state level if the interrupt request signal is at active state level;

performing a flush of the third data buffer and stopping the use of the third data buffer;

waiting for the first flush finishing signal to be at active state level;

determining whether the first flush finishing signal is at active state level after operations providing a required delay time due to a latency of the first flush finishing signal, while maintaining the second flush performance signal to be at active state level and maintaining the interrupt control signal to be at inactive state level;

permitting the interrupt request signal to reach a central process unit after the flush of the third data buffer has been finished;

maintaining the second flush performance signal to be at active state level and changing the interrupt control signal to be at active state level;

determining whether the interrupt request signal is at active state level and determining time when the interrupt request signal is finished in dependence upon whether the interrupt request signal is at active state level.

19. The buffer flush controller of claim 16, with said first state machine operating with the operational step of providing a required delay time due to a latency of the first flush finishing signal.

20. The buffer flush controller of claim 16, with said first state machine operating with the operational steps of:

changing a first flush performance signal and the second flush finishing signal into being at inactive state levels;

determining whether the bridge flush request signal of the peripheral component interconnect bus bridge circuit is at active state level after changing the first flush performance signal and the second flush finishing signal into being at inactive state levels;

waiting for the first flush finishing signal to be at active state level while changing the first flush performance signal to being at active state level and while maintaining the second flush finishing signal at inactive state level;

determining whether the first flush finishing signal is in an active signal after maintaining an active state of the first flush performance signal and an inactive state of the second flush finishing signal;

changing the first flush performance signal and the second flush finishing signal to being at active state levels; and determining whether the bridge flush request signal of the peripheral component interconnect bus bridge circuit is at active state level.

21. The buffer flush controller of claim 16, with said second state machine operating with the operational steps of:

maintaining the interrupt request signal so as to prevent performing an unnecessary flush of the third data buffer due to line noise;

performing a flush of the third data buffer and stopping the use of the third data buffer;

determining whether the first flush finishing signal is at active state level after operations providing a required delay time due to a latency of the first flush finishing signal; and permitting the interrupt request signal to reach a central process unit after the flush of the third data buffer has been finished.

22. The buffer flush controller of claim 16, with said second state machine operating with the operational steps of:

determining whether the interrupt request signal is at active state level after changing a second flush performance signal and an interrupt control signal to inactive state level;

maintaining the interrupt request signal at active state level;

changing the second flush performance signal and the interrupt control signal to being at inactive state levels;

maintaining the interrupt control signal at inactive state level if the interrupt request signal is at active state level and changing the second flush performance signal to being at active state level if the interrupt request signal is at active state level;

waiting for the first flush finishing signal to be at active state level;

maintaining the second flush performance signal to be at active state level and changing the interrupt control signal to be at active state level;

determining whether the interrupt request signal is at active state level and determining time when the interrupt request signal is finished in dependence upon whether the interrupt request signal is at active state level.

23. The buffer flush controller of claim 16, wherein when the interrupt of the advanced programmable interrupt controller is generated, the flush of the first data buffer is performed before an interrupt vector value is transmitted to the advanced programmable interrupt controller.

24. The buffer flush controller of claim 16, wherein when the interrupt of the advanced programmable interrupt controller is not generated, the flush of the first data buffer is performed before a direct memory access performs a peripheral component interconnect control.

25. A buffer flush controller of a peripheral component interconnect-peripheral component interconnect bridge, comprising:

a first compounding circuit outputting a bridge flush request signal of the peripheral component interconnect-peripheral component interconnect bridge, the bridge flush request signal being outputted to a corresponding device, said first compounding circuit outputting the bridge flush request signal when a first buffer flush signal is received from a first bridge of peripheral component interconnect-Extended Industry Standards Architecture connection, said first compounding circuit outputting the bridge flush request signal when a second buffer flush signal is from a system controller of a Extended Industry Standards Architecture system and is received after an interrupt is from an interrupt controller of an advanced programmable interrupt control;

a first state machine outputting first and second control signals to perform a flush of a data buffer, said first state machine stopping use of a data buffer when the bridge flush request signal from said first compounding circuit is received, said first state machine stopping use of the data buffer when a first flush finishing signal is received, the first flush finishing signal indicating that a flush of an inner buffer in the peripheral component interconnect-peripheral component interconnect bridge has been finished;

a second state machine outputting third and fourth control signals to perform a flush of the data buffer of the peripheral component interconnect-peripheral component interconnect bridge, said second state machine stopping use of the data buffer when the first flush finishing signal is received, said second state machine stopping use of the data buffer when an interrupt request signal is received:

a second compounding circuit outputting a third flush performance signal and a fourth flush finishing signal, said flush performance signal and said fourth flush finishing signal indicating that a buffer flush of the peripheral component interconnect-peripheral component interconnect bridge has been finished after compounding of said control signals received from said first state machine and second state machine and after compounding of a third flush finishing signal received from a bus controller unit;

said buffer flush controller being connected to a direct memory access and the buffer flush controller permitting a direct memory access to have a latency of a period greater than a period of test preparation of Extended Industry Standards Architecture: and said flush of the data buffer being performed before the direct memory access can access an Extended Industry Standards Architecture bus.

26. A computer system, comprising:

at least one of central processing units;

a processor bus connected to the central processing units;

a bus controller unit which is connected to the processor bus;

a first bus connected the bus controller unit;

a first bridge and a second bridge connected to the first bus;

a second bus connected to the first bridge;

a third bus connected to the second bridge; and a buffer flush controller which is connected between the first bridge and the second bridge, wherein the buffer flush controller monitors a buffer flush request for the second bridge, induced by bus-mastering or direct memory accessing of the first bridge, and outputs a control signal corresponding the buffer flush request.

27. The computer system of claim 26, wherein the buffer flush controller further monitors a buffer flush request for the second bridge and outputs a control signal corresponding the buffer flush request when the computer system is operated at programmable interrupt control mode.

28. A computer system, comprising:

a central processing unit controlling a computer system;

a processor bus coupled to said central processing unit, transmitting and receiving data to and from said central processing unit;

a bus controller unit coupled to said processor bus;

a first bus coupled to said bus controller unit, said bus controller unit controlling processor data conveyed between said first bus and said processor bus;

a first bridge coupled to said first bus;

a second bridge coupled to the first bus;

a second bus coupled to said first bridge, said first bridge controlling second bus data conveyed between said first and second buses;

a third bus coupled to said second bridge, said second bridge controlling third bus data conveyed between said first and third buses; and a buffer flush controller coupled to said first and second bridges, detecting a first buffer flush request for said second bridge, and outputting a control signal corresponding to the first buffer flush request when the first buffer flush request is detected, the first buffer flush request being induced by a selected one of bus-mastering and direct memory accessing of said first bridge.

29. The computer system of claim 28, said buffer flush controller further detecting a second buffer flush request for said second bridge, and outputting a control signal corresponding to the second buffer flush request when the second buffer flush request is detected, the second buffer flush request being induced when the computer system is operated at a programmable interrupt control mode.

* * * * *